May 2, 1933. C. PEARSON 1,906,871
MOTOR LAWN MOWER
Filed Aug. 21, 1931 3 Sheets-Sheet 1

Inventor
Charles Pearson
By H.P. Daniels
Atty.

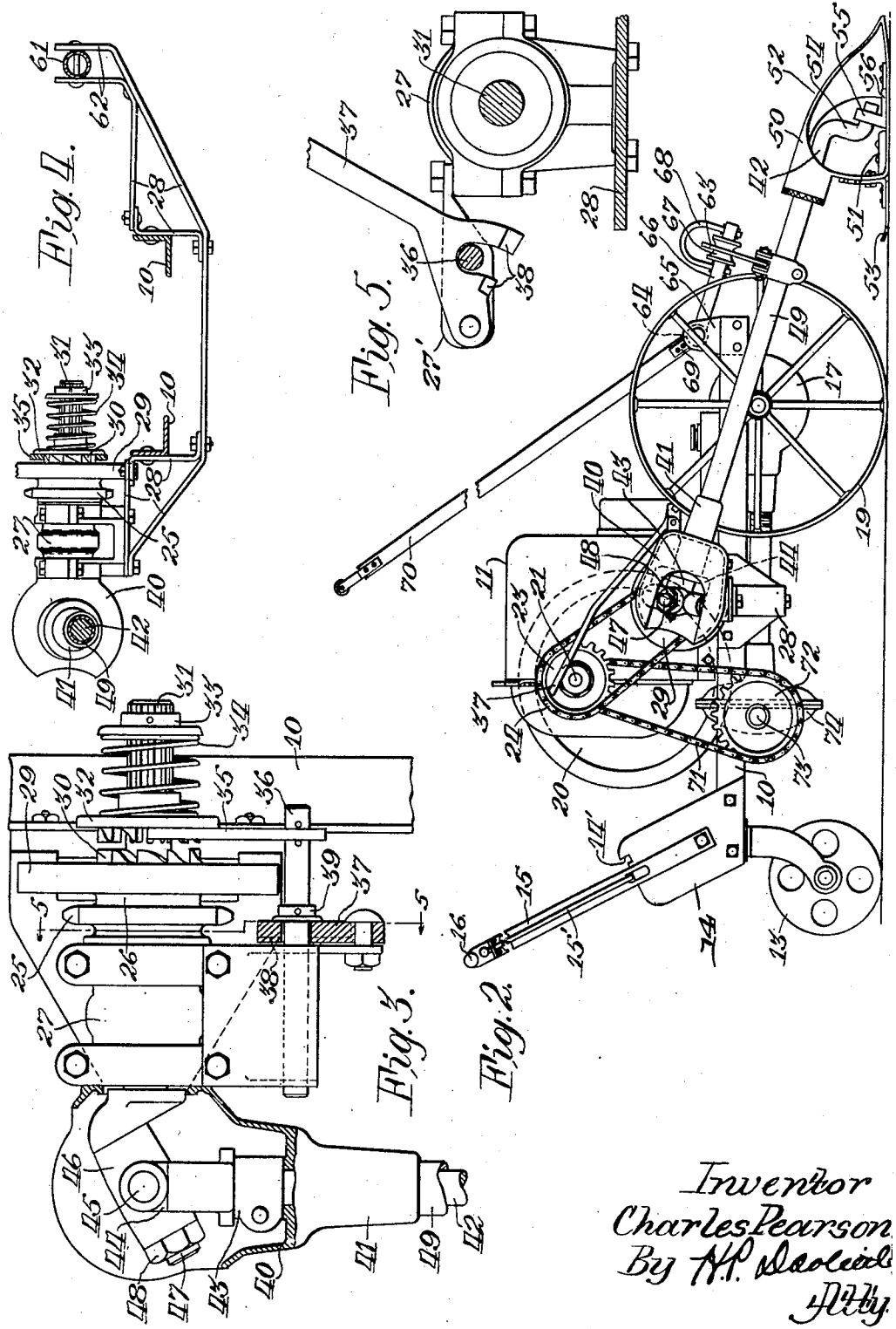

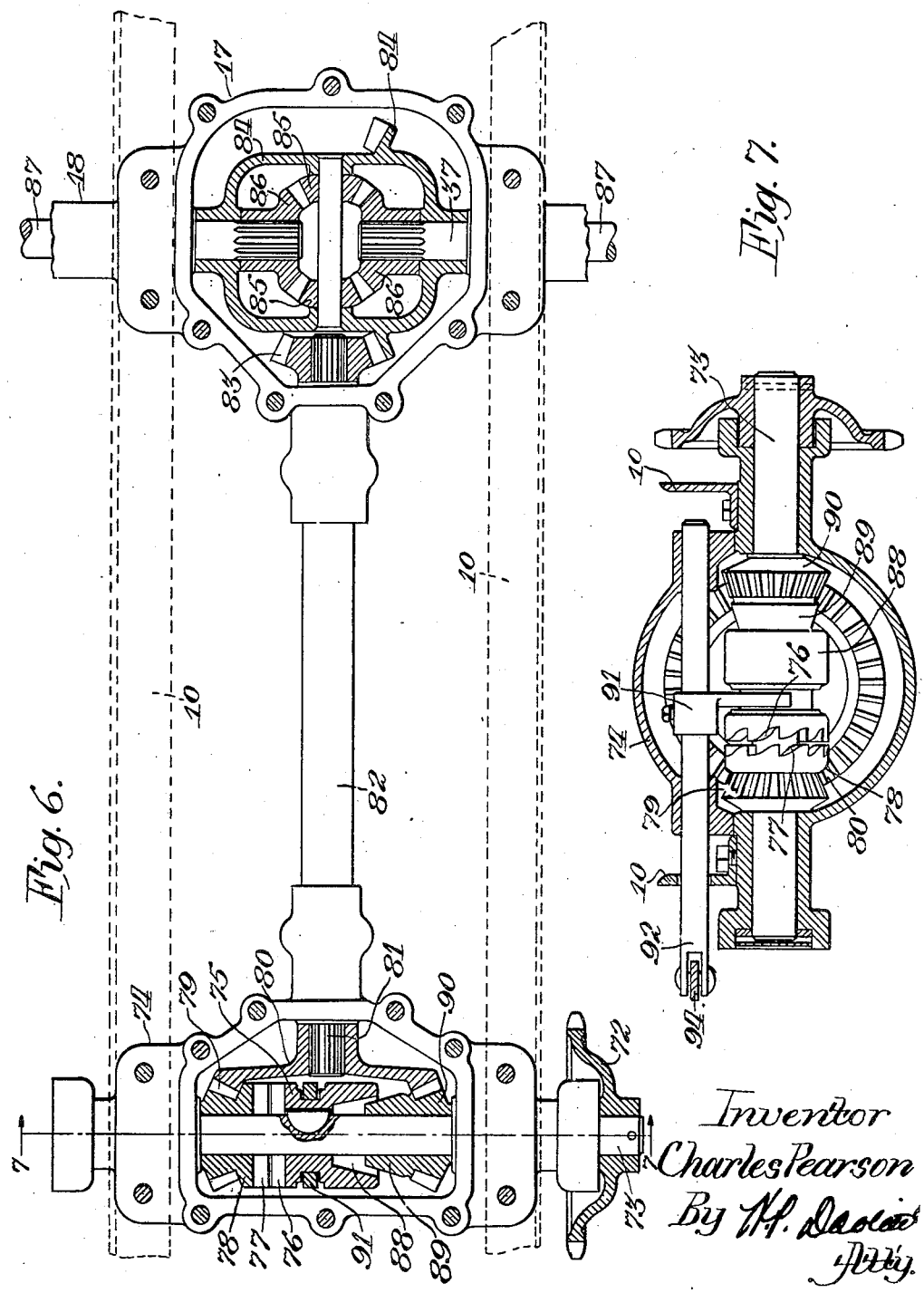

Patented May 2, 1933

1,906,871

UNITED STATES PATENT OFFICE

CHARLES PEARSON, OF CICERO, ILLINOIS, ASSIGNOR TO INTERNATIONAL HARVESTER COMPANY, A CORPORATION OF NEW JERSEY

MOTOR LAWN MOWER

Application filed August 21, 1931. Serial No. 558,504.

This invention relates to a power driven mower.

More specifically it relates to a small mower such as used for mowing lawns, which is constructed to be operated by a small motor or engine carried on the mower frame.

The principal object of the invention is to provide a simple, compact, power operated mower.

Another object is to provide the necessary controls for steering and varying the height of cut and the direction of motion. Another object is to provide an improved power driven, oscillating mechanism for driving a reciprocating sickle.

Other objects, including safety provisions and accessibility of parts, will be obvious from the detailed description to follow.

In the drawings:

Figure 2 is a side elevation of the same machine shown in Figure 1;

Figure 3 is an enlarged detailed view, partly in section, showing that particular part of the driving mechanism which embodies the throwout clutch and the means for oscillating the sickle driving member;

Figure 4 is an enlarged detail view showing the transverse supporting means on which the cycle and its driving mechanism is mounted;

Figure 5 is a detailed sectional view of the clutch throwout means, taken on the line 5—5 of Figure 3;

Figure 6 is an enlarged detail view of the traction driving means, with the cover plates of the housings removed, and the gears contained therein shown in section; and, Figure 7 is an enlarged sectional view of the traction reversing means, taken on the line 7—7 of Figure 6.

Figure 1:
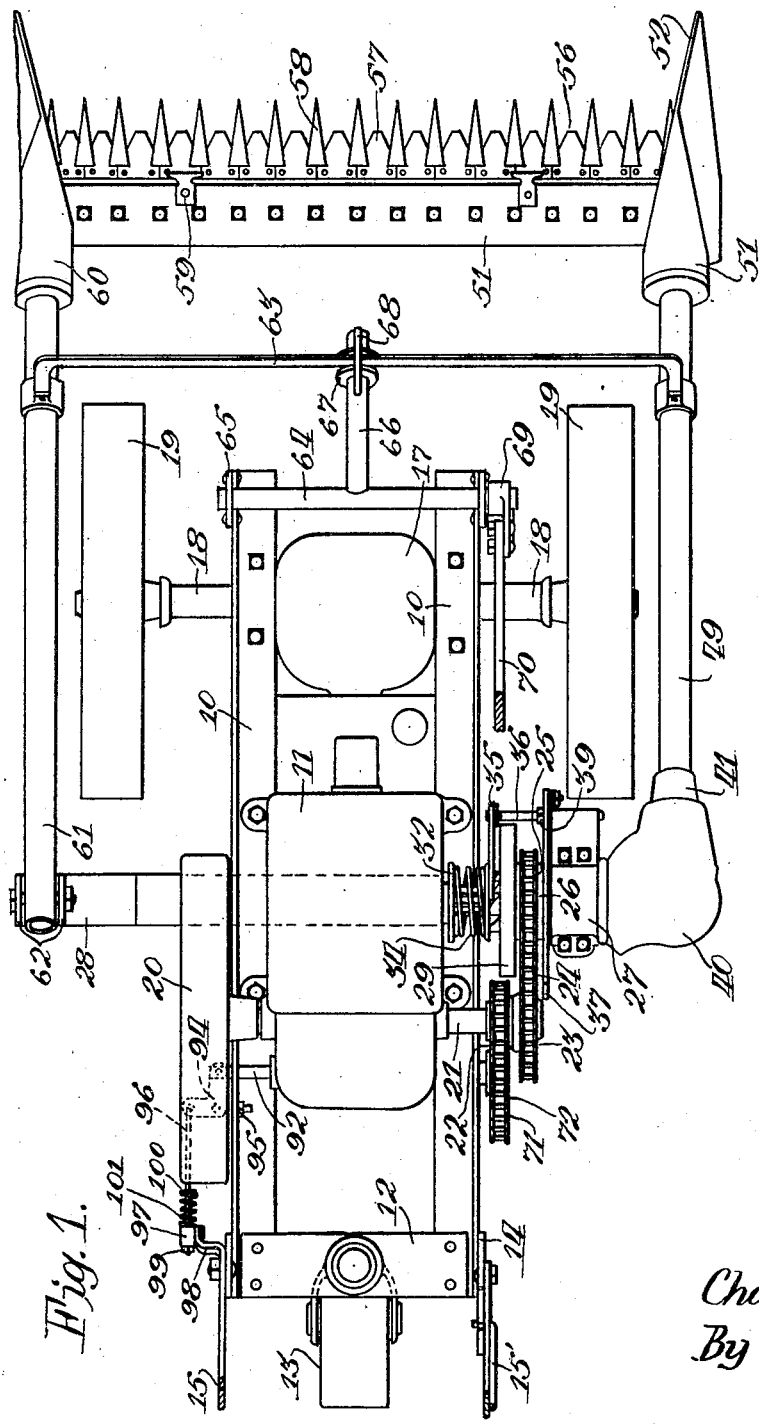
Figure 1 is a plan view of a machine embodying the invention.

The frame of the machine shown as embodying the invention is provided with two longitudinal extending angle bars 10 spaced apart to provide a support for a gasoline engine 11, which is rigidly secured to said frame members. At the rear of the frame members a transverse member 12, rigidly secured to the frame members, provides a means of attachment for a swiveled rolling support 13, which is mounted on a substantially vertical axis at the center of the member 12. Rearwardly and upwardly extending plates 14, secured at the rear of the frame members 10, provide means for pivotally attaching spaced upwardly and rearwardly extending handle bars 15. At one side a spring pressed latch member 15' is positioned to engage notches 14' formed in the member 14 at that side of the machine. A transverse handle 16 is connected to the top of said bars. Said handle provides means for steering the machine by an operator walking there behind. Adjacent their front ends the frame members 10 are secured to a housing 17. Said housing has an enlarged center portion for containing a differential as shown in Figure 6, and laterally extending portions 18 which contain driving axles for the traction wheels 19.

The engine 11 may be of any conventional type, such as that shown, in which a fly wheel 20 is mounted at one side and a power shaft 21 extends laterally from the other side. Said shaft is provided with two spaced chain sprockets 22 and 23. The chain sprocket 23 is connected by a driving chain 24 to a chain sprocket 25, rigidly mounted on a sleeve 26. Said sleeve is rotatably carried in a bearing bracket 27, secured to a transverse frame structure 28. Said frame structure is secured to the sides of the frame members 10, as shown in Figure 4, and has portions which extend laterally from the outer sides of the frame members and a bracing portion extending thereunder.

The sleeve 26 in the particular embodiment shown, is formed as one integral piece with the sprocket 25, a fly wheel 29 and a clutch member 30. The sleeve 26 is formed with a bore therethrough, through which a shaft 31 extends, said shaft being freely rotatable with respect to the sleeve 26. At the end adjacent the clutch member 30 said shaft is provided with a splined surface on which a second clutch member 32 is slidably mounted. A collar 33 is pinned to the outer end of the shaft 31 and a spring 34 is positioned around the shaft with one end abutting against the collar 33 and the other end abutting against the clutch member 32. The clutch members 30 and 32 are provided with mating ratchet teeth which are shaped to transmit power in one direction and to ratchet over each other in the other direction, the spring 34 being the means by which the teeth are held in engagement and by which axial movement is provided for when the teeth ratchet over each other.

To provide means for positively disengaging clutch members 30 and 32, a clutch throwout collar 35 is positioned at the inner side of a flange formed on the member 32. Said collar is secured to a shaft 36 which is mounted for reciprocating motion in a support 27' rigidly secured to the bracket 27. As shown in Figure 5, a clutch throwout member 37 is pivotally mounted on the support 27'. Said member is provided with a slotted portion arranged around the pivot point as an axis. Said portion is in radial alignment with the shaft 36. The forward edges 38, adjacent each side of the slot, are beveled to permit their insertion between a collar 39 formed on the shaft 36 and the portion of the support 27' adjacent the member 37.

The shaft 31 extends outwardly beyond the bracket 27 into a housing 40 which is pivotally mounted with respect to the bracket 27, coaxially with respect to the shaft 31. Said housing has a forwardly extending portion 41, in which a bearing surface is formed for a rotating shaft 42. Said shaft is provided inside the housing with a connecting member 43, having a portion rigidly secured to the end of the shaft 42 and a yoke of the type used with universal joints. Said yoke provides two laterally spaced arms 44, in which trunnions 45 are rotatably mounted. Said trunnions are part of a member 46 which is provided with a bore at right angles to the axis of the trunnions. The shaft 31 is provided with an angularly positioned crank 47 which extends through the bore in the member 46. A nut 48 holds the member 46 in position on the crank 47. This construction is of a conventional type and provides for transmitting oscillating movement to one shaft from a continuously rotating shaft positioned at right angles thereto. The shaft 42, which provides the drive for the cutter, extends through a drive shaft housing 49, rigidly connected to the housing 41 and to a member 50 positioned forwardly of the traction wheels and at one side thereof. The member 50, in addition to providing for the drive shaft, is shaped to form a divider for the grain or grass being mowed. Said member also provides a support at one end for a cutter bar 51. The forward end of the member 50 is provided with a sharp nose portion 52. The bottom of said member is shaped to ride the surface of the ground. An additional shoe 53 is provided at the rear of the member 50. Said shoe is vertically adjustable on the member 50, as shown in Figure 2. The height of cut of the mower may be regulated by vertical adjustment of the shoe 53.

The shaft 42 is provided with a crank end 54. Said crank end is mounted in an opening formed in a bracket 55 at one end of a cutter 56. Said cutter is of a conventional construction, being provided with a plurality of spaced blades 57. A plurality of guards 58 are secured to the cutter bar 51. Guiding brackets 59 are mounted on the cutter bar 51 for holding the cutter in position.

At the end of the cutter bar opposite the driving arm, a member 60, similar in construction to the member 50, is rigidly secured to said bar. A rearwardly extending hollow shaft 61, secured to the upper part of said member, is pivotally secured to upstanding ears 62 on the transverse support 28. The axis of said pivot is in transverse alignment with the axis of the housing 40. An arch 63 is pivotally attached to the housing 49 and to the hollow shaft 61 forwardly of the traction wheels. At the forward ends of the frame members 10 a transverse shaft 64 is mounted in bearing brackets 65 rigidly connected to said frame members. Said shaft is provided intermediate its ends with a forward extension 66 on which a grooved roller 67 is pivotally mounted on longitudinal axis. Said roller is positioned under the arch 63 with said arch seating therein. A guard 68 connected to the extension 66 at each side of the roller 67 passes over the top of the arch 63, preventing upward movement of said arch with respect to the roller 67. One end of the shaft 64 extends laterally beyond the bearing bracket at one side of the frame and carries a lever bracket 69 to which a rearwardly and upwardly extending lever 70 is attached. Said lever is provided at its upper end with a handle by which the operator may oscillate said lever.

The chain sprocket 22 through a chain 71, drives a chain sprocket 72 mounted on a transverse shaft 73. Said shaft extends through a housing 74, which is rigidly secured to the side frame members 10, as best shown in Figure 6. Inside the housing 74 a clutch member 75 is keyed to the shaft 73 for axial sliding movement with respect thereto. At one end said clutch member is provided with ratchet teeth 76 adapted to operatively engage similar teeth 77 formed on a forwardly driving clutch member 78. The clutch member 78 carries integrally therewith a spur gear 79 which is permanently in engagement with a bevel gear 80. Said gear is mounted on a longitudinally extending drive shaft 81. Said shaft extends through a housing 82 which is rigidly connected to the housing 74 and to the housing 17, previously described. A spur gear 83 is mounted on the shaft 81 within the housing 17. Said gear drives the carrier 84 of a conventional differential. Said differential contains planetary gears 85, which drive gears 86 mounted on the ends of axles 87. The axles 87 extend through the housing 18 and drive the traction wheels 19, which are mounted thereon.

The clutch member 75 at the end opposite the ratchet teeth 76 is provided with a conical clutch portion 88 which is shaped to engage a mating clutch member 89 rotatably mounted on the shaft 73. Said clutch member carries integral therewith a gear 90 which is positioned in permanent engagement with the bevel gear 80.

An annular groove is provided around the clutch member 75. A clutch throwout collar 91 is fitted in said grove for axially moving the clutch member on the shaft 73. Figure 7 shows the details of the clutch throwout mechanism. The collar 91 is secured to a shaft 92 slidably mounted in an axial direction with respect to the shaft 73. A bell crank 94 pivotally supported intermediate its ends on a bearing bracket 95 connected to one of the side frame members 10, is pivotally connected at one end to the shaft 92. An actuating link 96 connected to the bell crank 94 extends through a bearing block 97 pivotally mounted on a transverse axis on an extension 98 of one of the bars 15. The link 96 is slidable with respect to the block 97. A nut 99 at the outer end of the link 96 provides a stop. A second stop 100 is also provided beyond the other side of the block 97 on the link 96. A spring 101 is positioned around the link 96 with one end abutting the stop 100 and the other end abutting the block 97, whereby the nut 99 is held against said block.

In the operation of the device as described the gasoline engine is put into operation whereby the shaft 21 and the sprockets 22 and 23, carried thereby, are continuously rotated. The shaft 73 is also continuously rotated through the chain 71. The clutch member 75, carried by the shaft 73, is also continuously rotated. It is so constructed that in the central position neither of the oppositely positioned clutch members 78 and 89 are engaged. When it is desired to drive the machine in a forward direction the latch member 15' is released and the handle 16 is pushed forwardly whereby the portion 98 of the lever 15 at the left side of the machine is moved downwardly. Through the linkage previously described in detail this movement brings the shaft 92 toward the left side of the machine, whereby the clutch throwout collar 91 brings the clutch member 75 with the teeth 76 into engagement with the teeth 77. Through the gears 79 and 80, the shaft 82 and the gear 83 power is transmitted to the differential carrier 84 whereby the machine is driven in a forward direction by the power transmitted through the differential to the traction wheels 19.

When it is desired to reverse the direction of the machine the latch 15' is released and the handle 16 is pulled to the rear. This movement disengages the clutch member 75 and brings it into neutral position. If the rearward movement of the handle 16 is continued the clutch member 75 is shifted until the clutch surface 88 engages the clutch member 89, whereby the gear 90 is put into operation. The gear 90, operating in a reverse direction to the gear 79, the machine is driven in a reverse direction when the gear 90 is rotating. It will be understood that as a comparatively small part of the operation of a machine is in a reverse direction the conical clutch is provided for movement in that direction. In the forward direction the positive clutch is provided. It will also be understood that the spring 101 provided on the link 96, provides for rearward and upward movement of the link 96, independent of movement of the block 97. This construction provides for ratcheting of the teeth 76 over the teeth 77, thereby allowing the continued rotation of the central clutch member 75 when an obstruction is encountered over which the mower cannot pass.

Through the chain 24 the sprocket 25, the fly wheel 29 and the clutch member 30 are continually rotated about the shaft 31. When it is desired to put the cutting mechanism into operation the lever 37 is lifted forwardly whereby it is removed from engagement with the collar 39. The spring 34 then moves the clutch member 32 along a splined end of the shaft 31 until the ratchet teeth thereon engage the ratchet teeth on the clutch member 30. It will be understood that this construction provides a safety clutch, the spring 34 permitting the clutch member 32 to move upwardly and ratchet over the teeth on the clutch member 30 when an overload is encountered. The crank end of the shaft 31 in continual rotation gives the member 46 such a motion that the trunnions 45 mounted thereon are oscillated. This oscillation is transmitted through the yoke 43 to the shaft 42. At the lower end of the shaft 42 the oscillating movement is transmitted to reciprocating movement by the loose connection between the crank end 54 of said shaft and the bracket 55 mounted on the sickle 56. The parts are so proportioned and constructed that the length of movement of the sickle during reciprocation is sufficient to obtain the proper cutting action of the sickle blades with the ledger plates with which they cooperate.

The shaft 64, the extension 66, the roller 67 and the guards 68 provide means for lifting the cutter bar vertically by movement of the lever 70. The operator may reach forward and pull downwardly on the lever 70 whereby the cutter bar and the shaft parts are lifted vertically, said structure pivoting about the axis on which the housing 40 and the shaft 61 are mounted. The description of the device as disclosed and the explanation of operation sets forth the machine in such a manner as to show how the objects of the invention have been obtained. A machine has been provided in which all conditions of operation may be met by adjustment of the various parts by the operator or by the automatic means provided on the machine itself. The machine may be started by the operator and may be moved in a forward or rearward direction by operation of the clutch as attached to the bars 15 at the rear of the machine.

The cutter bar and shaft parts may be lifted to pass over obstructions by operation of the lever 70. The cutting mechanism may be thrown into and out of gear by the operation of the lever 37. In addition to these manual controls the ratchet clutches provide for automatic slipping when the machine itself encounters an obstruction or when material becomes wedged between the cycle blades and the guards.

It is to be understood that applicant has shown only a preferred embodiment of his device and that he claims as his invention all modifications falling within the scope of the appended claims.

What is claimed is:

1. A power driven mower comprising a wheeled supporting frame having spaced, forwardly positioned traction wheels, an engine mounted on said frame, a mower unit forwardly positioned with respect to said frame and pivotally connected to the frame on a transverse axis rearwardly of the traction wheels, and means for operating said unit and driving said traction wheels from the engine.

2. A power driven mower comprising a wheeled supporting frame having spaced, forwardly positioned wheels, a laterally extending transverse support secured to the frame rearwardly of the traction wheels, and a forwardly positioned mower unit pivotally connected to said support.

3. A power driven mower comprising a wheeled supporting frame having spaced, forwardly positioned traction wheels, a mower unit positioned in advance of said wheels and pivotally connected to the frame on an axis rearwardly of said wheels, said mower unit having a width of cut greater than the distance between the traction wheels, means carried by the mower unit to direct the mowed material between said wheels, and power operated means for actuating said unit and driving said traction wheels.

4. A mower comprising a wheeled supporting frame, a mower unit pivotally attached to said frame on a transverse axis, said unit consisting of spaced side members, a transversely extending cutter bar, dividers at each end of said bar connected to the side members, a sickle, means for operating said sickle, and means on the frame operable to lift said mower unit about its pivot axis, said means consisting of an arch connecting the side members, a rock shaft mounted on the frame, a lifting arm operatively engaging said arch, and means to rotate said rock shaft.

5. A power driven mower comprising a wheeled supporting frame, a mower unit having spaced, longitudinally extending side members, said members being pivotally connected to the frame on a transverse axis, a member at one side carrying a shaft for operating the mower unit, a shaft extending from the same side of the frame coaxially with the transverse axis, means on the frame for actuating said shaft, and means connecting said shaft to the mower operating shaft.

6. A power driven mower comprising a wheeled supporting frame, a mower unit mounted thereon, an engine mounted on said frame, power drive connections between the engine and the mower unit, power drive connections between the engine and one of the supporting wheels, said means including reversing gearing and a clutch, an operator's handle pivotally mounted on the supporting frame, means operatively connecting said handle to the clutch in such a manner that the mower is driven in the direction in which the handle is moved, and means for locking said handle in position.

7. A device as set forth in claim 6, in which the reversing means consists of a shaft, two spaced oppositely beveled spur gears mounted for rotation thereon, a drive shaft, a beveled gear rigidly mounted thereon positioned in constant mesh with each of said spur gears, a clutch member splined on the transverse shaft for movement axially thereof, and means for engaging said clutch member with either of said gears.

8. A power driven mower comprising a housing, a diffenertial mounted in said housing, driving axles and a driving shaft extending therefrom, traction wheels mounted on said axles, a supporting frame consisting of laterally spaced members rigidly secured to the housing and extending rearwardly therefrom, a transverse rear member, a swiveled rolling support mounted on said rear member, an engine mounted on the frame, means connecting said engine to the driving shaft, a mower unit pivotally mounted on the frame on a transverse axis, and means for driving said unit from said engine.

9. A power driven mower comprising a wheeled supporting frame, a mower unit mounted thereon, an engine mounted on said frame, power drive connection between the engine and the mower unit, power drive connections between the engine and one of the supporting wheels, said means including reversing gearing, an operator's handle pivotally mounted on the supporting frame, and means operatively connecting said handle to the gearing in such a manner that the mower is driven in the direction in which the handle is moved.

10. A power driven mower comprising a wheeled supporting frame, a mower unit mounted thereon, an engine mounted on said frame, power driven connections between the engine and the mower unit, power drive connections between the engine and one of the supporting wheels, said means including reversing gearing and a clutch, an operator's handle pivotally mounted on the supporting frame, and means operatively connecting said handle to the clutch in such a manner that the mower is driven in the direction in which the handle is moved.

11. A power driven mower comprising a wheeled supporting frame having spaced forwardly positioned wheels, a transverse supporting member positioned rearwardly of said wheels and extending laterally beyond the wheels, and a mower unit positioned in advance of the wheels and pivotally connected to the transverse member by portions of the unit extending rearwardly outside said wheels.

12. A power driven mower comprising a wheeled supporting frame having spaced forwardly positioned wheels, a transverse supporting member positioned rearwardly of said wheels and extending laterally beyond the wheels, a mower unit positioned in advance of the wheels and pivotally connected to the transverse member by portions of the unit extending rearwardly outside said wheels, and a lifting means for the mower unit including a lifting lever pivotally connected to the frame, said lever extending forwardly between the wheels and being connected to the mower unit.

In testimony whereof I affix my signature.

CHARLES PEARSON.